United States Patent [19]

Little

[11] 4,165,919
[45] Aug. 28, 1979

[54] ADJUSTABLE OPTICAL FILTER

[76] Inventor: Robert T. Little, 160 Columbia Heights, Brooklyn, N.Y. 11201

[21] Appl. No.: 823,030

[22] Filed: Aug. 9, 1977

[51] Int. Cl.² .................................................. G05D 25/00
[52] U.S. Cl. ..................................... 350/273; 350/17
[58] Field of Search .................. 350/1.7, 17, 272, 273, 350/316, DIG. 3

[56] References Cited

U.S. PATENT DOCUMENTS

| | | | |
|---|---|---|---|
| 1,175,961 | 3/1916 | Kunz | 352/66 |
| 1,794,727 | 3/1931 | O'Grady | 352/66 |
| 2,186,203 | 1/1940 | Centeno | 350/272 UX |
| 2,950,648 | 8/1960 | Rhodes | 350/313 |
| 2,995,997 | 8/1961 | Nieuwenhoven | 350/272 UX |
| 3,012,461 | 12/1961 | McCall | 350/313 |
| 3,775,226 | 11/1973 | Windorf | 350/1.7 X |
| 3,896,463 | 7/1975 | Laskey | 350/DIG. 3 |
| 3,900,021 | 8/1975 | Makepeace et al. | 350/DIG. 3 |
| 3,982,825 | 9/1976 | Mitchell | 350/313 |

*Primary Examiner*—John K. Corbin
*Assistant Examiner*—Matthew W. Koren

[57] ABSTRACT

An adjustable solar filter assembly has two disc shaped relatively rotatable shields each having circumferentially spaced apart light passing openings separated by opaque portions. A filter element comprising an alumnized plastic sheet covers the openings in one of the shields. Relative rotation of the two discs changes the effective light passing area without changing the optical aperture provided by the filter to adjust for changing light conditions and/or to adjust the brightness of the viewed image. The filter assembly includes support and mounting members that enable the filter assembly to be mounted near the center of the exterior lens of the telescope.

22 Claims, 3 Drawing Figures

ADJUSTABLE OPTICAL FILTER

BACKGROUND OF THE INVENTION

The present invention relates to solar filters of the type employed on optical instruments, such as telescopes, to filter sunlight. Such filters are required to protect the user's eyes from harm as well as to prevent overheating of the optical instrument and to enable viewing and photography through the instrument under sunlight conditions.

Solar filters essentially require a metal component to reflect or otherwise block solar radiation, particularly infrared radiation and ultraviolet radiation. Traditionally, the silver particles in exposed black and white photographic film have been employed as effective safety filters for sunlight. More recently, metalized plastic films, such as polyester films having a fiber deposited aluminum coating thereon have been employed for the purpose.

Generally such filters are disc shaped and are mounted externally of the telescope or other optical instrument to cover the lens. The metalized filter element passes a small percentage of the total sunlight therethrough and effectively blocks most of it from entry into the optical instrument.

One difficulty with prior art filters is that, if light conditions change or if it is desired to change the brightness of the image provided by the optical instrument, the filter provides no adjusting or compensating ability other than, possibly, replacing one filter with another of different light passing capability. This is obviously impractical and would require a stockpiling of numerous filters of different density and light passing ability for each different sized optical instrument. Further, fine gradations of density of solar filters are simply not available and so adjustment can only be made with large incremental changes in the amount of light allowed to pass into the optical system of the instrument.

It is accordingly an object of the present invention to provide a novel solar filter structure which is adjustable to admit, in infinitesimally small increments, varying quantities of light through the filter to adjust brightness of the image and/or compensate for changing light conditions.

It is another object of the present invention to provide such a solar filter in which such adjustments may be made without changing the effective optical aperture provided by the filter.

It is a further object of the present invention to permit mounting in a simple manner that permits easy removal and allows ventilation, thereby avoiding heat buildup.

Other objects and advantages of the present invention will be apparent from the following description thereof.

SUMMARY OF THE INVENTION

In accordance with the present invention, there is provided an adjustable solar filter assembly for a telescope. The filter includes a support for detachably mounting the filter assembly in the path of light rays being gathered by the telescope. The support includes a mounting fixture for engagement upon the exterior surface of the exterior lens of the telescope near its center but for substantial freedom from the telescope circumferentially. The support also includes a support member that releasably engages the support fixture. A first opaque shield member extends substantially concentrically about the support member and has at least one light passing opening therein. It is dimensioned and configured to traverse the optical aperture of the associated telescope, the opening having a radial dimension which defines the effective optical aperture provided by the solar filter. A light-transmitting filter element overlies the opening and has a light blocking metallic component to reduce the amount of light transmitted through the filter element. A second shield member has an opaque portion dimensioned and configured to overlie at least part of the opening. Means mounting the shield members on the support member and permitting rotation of the shield members relative to each other are provided, the second shield member thereby being movable relative to the first shield member to overlie and thereby close selected portions of the opening to reduce passage of light therethrough without reducing the radial dimension of the opening.

Certain objects of the invention are attained when the opaque portion is dimensioned and configured to overlie all of the opening and thereby entirely close the opening.

Certain objects of the invention are attained when at least the first shield member is disc shaped and has a plurality of openings formed therein which are circumferentially spaced apart and have respective outer edges which are disposed adjacent to the peripheral edge of the disc, the radial distance of the outer edges from the center of the disc defining the first dimension of the openings. The second shield member may also be disc shaped and the first and second shield members mounted for rotation relative to each other about a common axis of rotation. The second shield member may also contain a plurality of circumferentially spaced openings therein, the opaque portion of the second shield member being defined by portions thereof extending between the second mentioned openings.

Certain other objects of the invention are attained when the first opaque shield member has a plurality of light passing openings therein which are defined by spaced apart radially extending side edges connecting arc shaped outer edges and inner edges (which may also be arc-shaped) spaced radially inwardly of the outer edges. The second opaque shield member may have therein a plurality of circumferentially spaced apart light passing openings of generally similar configuration as the first mentioned openings with opaque portions of the second shield member between the second mentioned openings being dimensioned and configured to overlie the first mentioned openings. The second shield member is movable relative to said first shield member whereby the opaque portions overlie and thereby close selected radial portions of the first mentioned openings to reduce passage of light therethrough.

DESCRIPTION OF THE PREFERRED EMBODIMENTS

Figure 1:
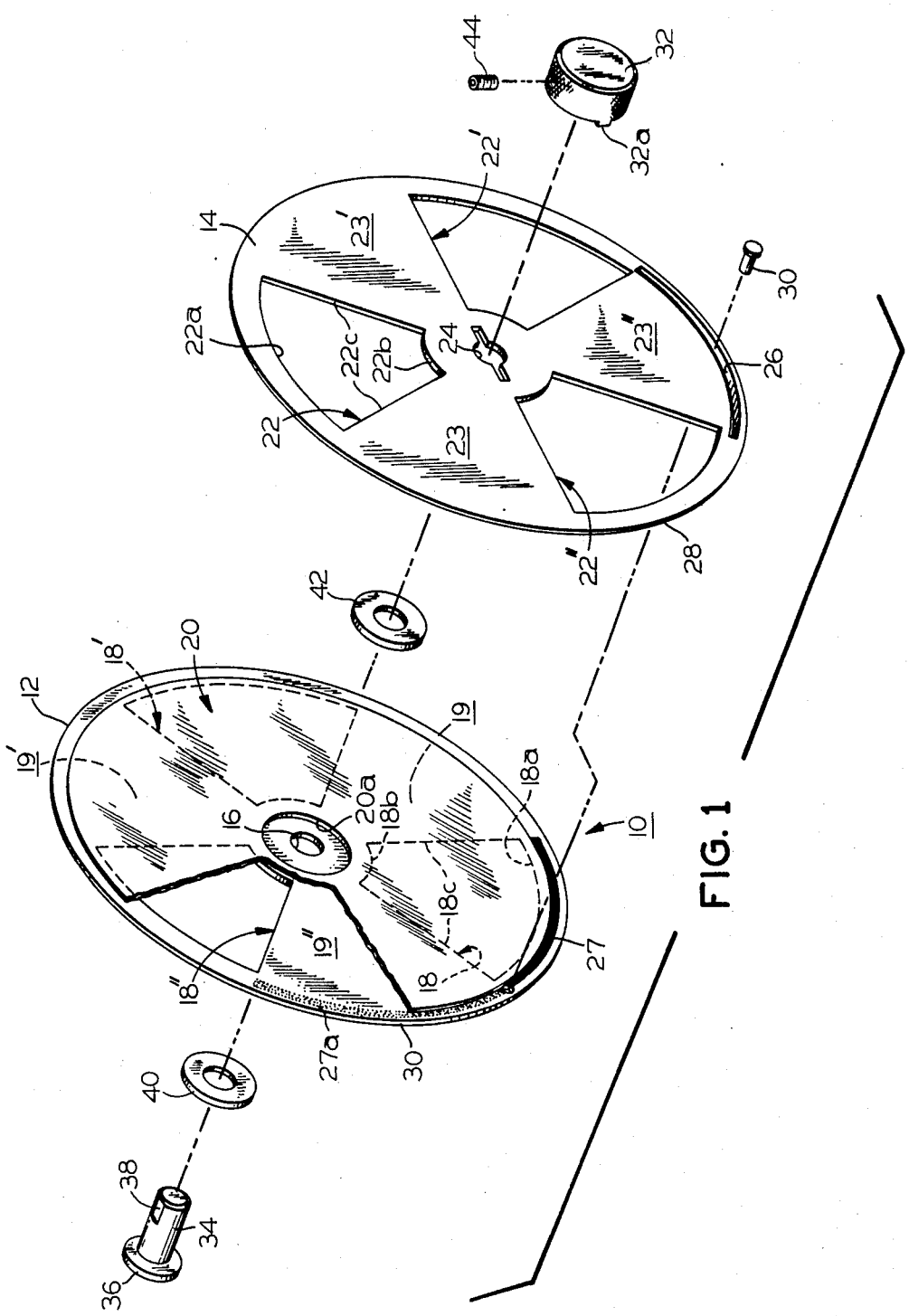
FIG. 1 is an exploded perspective view of one embodiment of an adjustable optical filter assembly in accordance with the present invention.

Referring to FIG. 1, the optical filter is generally indicated at 10 and includes a first opaque shield 12 and a second opaque shield 14, both of which are generally disc shaped and have a plurality of openings formed therein as described more fully below.

First opaque shield 12 has a central passage 16 and three light admitting openings 18, 18' and 18" formed therein. Openings 18, 18' and 18" are separated from each other by opaque portions 19, 19' and 19" of shield 12. A filter element 20 is affixed to the front surface of first shield 12 and covers openings 18, 18' and 18". Filter element 20 is partially broken away in FIG. 1 for clarity of illustration. A circular central cutout 20a is formed in filter sheet 20. Filter element 20 is any light-transmitting material capable of reducing the amount of light transmitted through it and suited to effectively filter sunlight. Filter element 20 therefore contains a metal component for reducing or eliminating transmission of radiation, particularly infra-red and ultraviolet radiation. Most preferably, filter element 20 comprises a metalized plastic sheet, i.e., a sheet of synthetic organic, polymeric material having a thin metal coating thereon. A preferred material for filter element 20 is a polyester plastic sheet, such as that sold under the trademark MYLAR by E.I. DuPont DeNemours & Co., which has been coated with aluminum to a suitable thickness to provide the desired reduction of sunlight passed therethrough. Typically, element 20 may be made of MYLAR polyester of ½ to 2 mils thickness having an aluminum coating of a thickness to provide sheet resistance of about 0.5 to 5 ohms per square.

Second opaque shield 14 contains three light admitting openings 22, 22' and 22" which are substantially identical in size and shape to first openings 18, 18' and 18". Opening 18 is defined by outer edge 18a, inner edge 18b and side edges 18c which connect the inner and outer edges. Openings 18' and 18" are identically configured, as are openings 22, 22' and 22". Outer edge 22a and inner edge 22b and side edge 22c opening 22 are numbered in FIG. 1. The respective side edges lie on radii of the circle defined by the outer circumference discs 12 and 14 and the inner edges and outer edges lie on the circumferences of circles concentric to the circles defined by the outer circumferences of discs 12 and 14. The resultant openings are therefore in the segments of the annular plane defined between two concentric circles of different diameters.

Both the discs comprising shields 12 and 14 are constructed of any suitable opaque material, i.e., any material which will block the passage of light therethrough. Thus, opaque shields 12 and 14 may be made of cardboard, metal or any opaque plastic material otherwise suitable for the intended purpose.

An adjusting knob 32 has bosses 32a extending radially along the inside face thereof and sized to be keyed into the elongated slots of central passage 24 in shield 14, whereby rotation of knob 32 will rotate opaque shield 14 with it.

Figure 3:
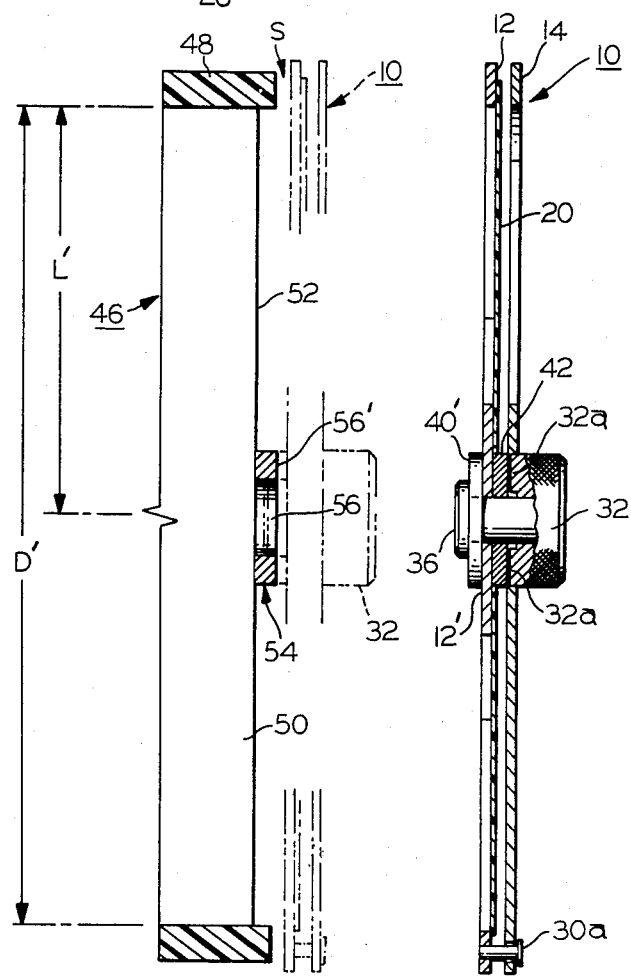
FIG. 3 is a side view in elevation, on a scale enlarged relative to FIG. 2, showing the filter of FIG. 2 exploded away from the end of a telescope on which it is mounted.

A mounting shaft 34 has an enlarged head 36 at one end thereof and a flattened land portion 38 formed adjacent its other end. A washer 40 is adapted to fit over shaft 34 and abut against the inside shoulder provided by head 36 as best shown in FIG. 3. Washer 40 is made of a magnetically susceptible material, e.g., washer 40 may be a common iron washer. Washer 40 is rotatable relative to shaft 34, bearing against head 36, and is non-rotatably affixed to the rear surface 12' of opaque disc 12 at the center thereof. This may be accomplished by gluing washer 40 to disc 12 so that the central opening (unnumbered) of washer 40 aligns with central passage 16 in opaque shield 12. Obviously, any suitable manner of thus affixing washer 40 to the center portion of rear surface 12' of shield 12 may be employed. For example, suitable small screw fasteners or the like may be used. An intermediate washer 42 is positioned between shields 12 and 14 and is also adapted to fit over shaft 34 as also shown in FIG. 3. The end of shaft 34 which has flattened land portion 38 thereon is adapted to fit within a central passage (unnumbered) formed in knob 32. A set screw 44 (FIG. 1, not shown in FIG. 3) is threaded within a radially extending passage (unnumbered) formed in knob 32 and its innermost end seats on land portion 38 to nonrotatably affix knob 32 to shaft 34.

As best seen in FIG. 3, the assembled filter 10 is of compact construction with shields 12 and 14 coaxially mounted upon shaft 34 and spaced from each other by intermediate washer 42. Pin 30 has an enlarged head portion 30a, the diameter of which is greater than the width of slot 26. The end of pin 30 opposite head portion 38 is affixed to first shield 12 in any convenient manner so that upon rotation of second shield 14 relative to first shield 12 the opposite ends of slot 26 serve as stops limiting the degree of relative rotation between shields 12 and 14.

Still referring to FIG. 3, there is shown the lens end of an optical instrument generally indicated at 46, for example, an astronomical viewing telescope. The telescope has a tubular body portion 48 and an exterior lens 50 is recieved therein. Affixed to the geometric center of the exterior surface 52 of lens 50 is a magnetic washer 54. Washer 54 is disc-shaped permanent magnet and has a cylindrical-shaped central opening 56 and an annular surface 56'. One side of magnetic washer 54 is affixed to the outer surface 52 of lens 50 by a suitable adhesive capable of bonding a metal to glass, such as an epoxy adhesive. As indicated by the partial dot-dash line rendition of filter 10 in FIG. 3, filter 10 is mounted on optical instrument 46 by placing an annular surface 40' of washer 40 in contact with annular surface 56' of magnetic washer 54, the magnetic attraction securely holding filter 10 in place. Filter 10 is seen to be so configured and dimensioned as to traverse the optical aperture of the associated optical instrument 46, in the path of light rays to be gathered by the instrument. Head 36 of mounting shaft 34 is received within central opening 56 of magnetic washer 54. For example, opaque shield 12 may be provided at its periphery 30 with a rearwardly (leftwardly as viewed in FIG. 3) extending lip adapted to fit over the edge of tubular body portion 48 to removably hold optical filter 10 in place. However, the illustrated mounting means is preferred since it provides a small space indicated at S in FIG. 3 around the rim of body portion 48 which provides a ventilation space and minimizes heat buildup when the instrument is used in direct sunlight. It will be appreciated by those skilled in the art that obstructing the center portion of lens 50 with the central mounting portion of the optical filter does not adversely affect performance of the telescope 46 and, so long as the effective optical aperture is unchanged, resolution of the image attained is not adversely affected.

As will be appreciated by those skilled in the art, the optical aperture of a telescope or other optical instrument is determined by twice the radius of its exterior or light gathering lens. In FIG. 3, the radius of lens 50 of telescope 46 is indicated by the dimension line L'. The optical aperture of telescope 46 is accordingly twice L', or diameter D' of lens 50 which is, of course, circular in plan view.

Figure 2:
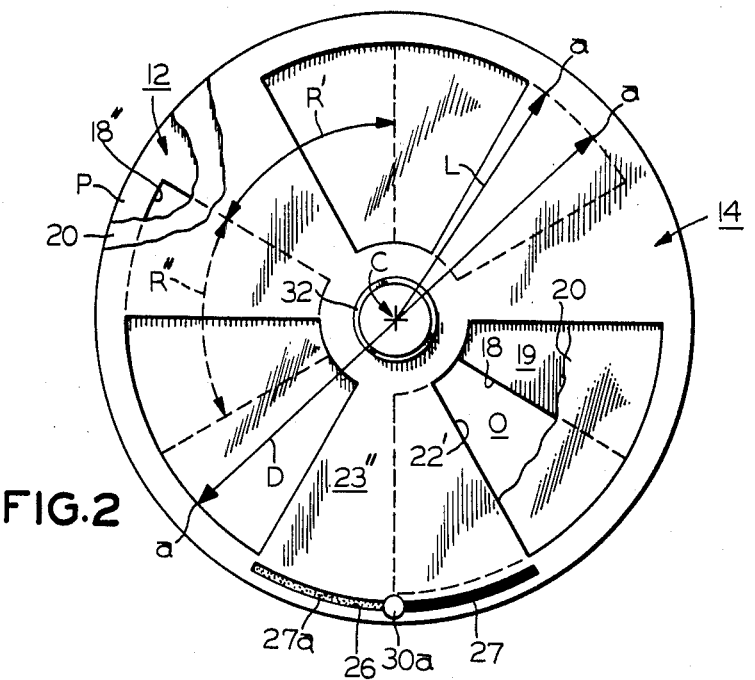
FIG. 2 is a front end view in elevation of the filter of FIG. 1.

Opening 18, 18' and 18" (as well as openings 22, 22' and 22") of filter 10 have an effective radius indicated by dimension line L in FIG. 2. That is, the openings extend to a point or points a which are remote from the center C of filter 10 by a distance L measured radially from center C. That is, the openings extend as far as points a which lie along the circumference of a circle of radius L centered at point C. This dimension L is the "radial dimension" referred to in the claims and specification and measures the radial distance from the portion (normally the center) of the filter which is aligned with the center of the lens to the portion of the opening remotest from the center of the lens. Even if two of the openings were completely closed, so long as one of the openings extended as far as a point along the circle on which points a lie, the effective optical aperture provided by filter 10 is unchanged. The existence of opaque portions of the filter adjacent the center C and between the openings does not change the optical aperture of it. In order that the optical aperture of a given optical instrument is not reduced by its associated filter, the dimension L (or speaking in terms of diameter, the dimension D) of the filter (FIG. 2) is made at least as great as, and preferably slightly larger than, the corresponding radius L' or diameter D' of the instrument (FIG. 3). For example, for an eight inch telescope, dimension D of filter 10 would be eight inches (or slightly larger to allow for manufacturing tolerance) and the overall diameter about eight and one-half inches.

Referring now jointly to FIGS. 2 and 3, with filter 10 mounted in place, lens 50 of optical instrument 46 is suitably positioned for viewing, and sunlight which would normally enter lens 50 is blocked by optical filter 10. The amount of light gathered by lens 50 and therefore the brightness of the image is of course determined by the sunlight filtering power of the filter and the strength of the sunlight impinging upon it. Optical filter 10 enables the operator, by rotating shield 14 relative to shield 12, to change the effective light-passing area of filter 10 through which sunlight is filtered, so that the operator may compensate for different strengths of sunlight impinging on the instrument and maintain a selected image brightness, or adjust the brightness as desired.

This is accomplished simply by rotating knob 32 which, by virtue of the engagement of bosses 32a with shield 14, causes shield 14 to rotate. Washer 40, securely held by magnetic attraction to magnetic washer 54 and glued or otherwise secured to first shield 12 holds first shield 12 stationary. As seen in FIG. 2, such rotation of second shield 14 relative to first shield 12 adjusts the amount of openings 18, 18' and 18" which are covered by the opaque portions 23, 23' and 23" of shield 12. In FIG. 2 (in which for clarity of illustration only openings 18 and 22 and associated opaque sectors 23 and 23' are numbered) about one-half of the area of openings 18, 18' and 18" are covered by opaque portions 23, 23' and 23" respectively, leaving an effective opening (indicated by the letter O with respect to opening 18) of about one-half the maximum available. Filter element 20 is broken away partially in the area of opening 22 for clarity of illustration. Since, at maximum opening, the opaque portions of filter 10 block one-half the total area, filter element 20, for a given density of filter desired, should have a density of about one-half of the density of the filter element of a conventional filter whose effective surface is substantially all made of the filter element and not blocked by opaque portions.

Referring to FIG. 1, it will be noted that an arc-shaped indicia strip 27, 27a is provided on shield 12, generally corresponding in shape to slot 26 and extending adjacent the outer edge 18a of opening 18, and a corresponding strip adjacent the peripheral edge of shield 12 in opaque portion 19" thereof. Segment 27 is dark and segment 27a is a light or contrasting color. With this arrangement, slot 26 serves as an indicator of the setting of filter 10. At the setting shown in FIG. 2, one-half of slot 26 shows the dark strip 27 and the other half shows the light strip 27a, indicating that the filter is at its half-open half-closed position. Further clockwise movement of shield 14 as viewed in FIG. 2 would more fully expose openings 18, 18' and 18" thereby increasing the total open area and this would be indicated to the operator by further covering of dark colored strip 27 and further exposing of light colored strip 27a.

It will be noted that the cooperation provided by opaque portions 23, 23' and 23" and openings 18, 18' and 18" maintain unchanged the effective optical aperture provided by the filter 10 until, of course, the filter is completely closed. Thus, the optical aperture of the telescope 46 remains unchanged by the filter 10 regardless of the setting of the filter. The opaque portions of the filter move circumferentially relative to the openings so as to leave open a segment of the opening extending to outer edges 18a, until the filter is completely closed.

Preferably, in order to provide a maximum available open area, openings 18, 18' and 18", as indicated by the arrow R' in FIG. 2, are equally spaced from each other. In other words, opaque sectors 19, 19' and 19" subtend 60 degrees of arc about the geometric center C of the circle defined by disc shaped shields 12 and 14. Similarly, openings 18, 18' and 18" subtend 60 degrees of arc about center C as indicated by the arrow R". The peripheral surface portion P of shield 12 (and of shield 14) is narrow, being only slightly wider than that necessary to accommodate slot 26 and indicia 27, 27a, and to provide reasonable structural strength.

In use, filter sheet 20 blocks sunlight, particularly infrared and ultraviolet radiation components, from entering into lens 50 while admitting sufficient light for viewing, photography, etc. As sunlight conditions change, or if the viewer wishes to change the brightness of the observed image, shield 14 may be selectively rotated to adjust the total effective open area provided, and thereby the amount of light gathered. Opaque portions of the filter move circumferentially across the openings to leave the effective optical aperture unchanged. Unlike prior art filters, the adjusting feature of the present invention provides for essentially infinite increments of adjustment of the amount of light passed through the filter which enables "fine tuning" of the amount of light gathered.

While the invention has been described in detail with reference to a specific and preferred embodiment thereof, it will be apparent that upon a reading and understanding of the foregoing numerous alterations and modifications may be made to the preferred embodiment which are nonetheless within the spirit of the present invention. For example, opaque portions of the second shield could be provided by fan shaped blades instead of a disc having openings therein. For another example, although the opaque portions of the filter preferably are truly opaque, i.e., do not pass any light therethrough, it will be appreciated that the opaque portions could conceivably be made of a material to pass some small proportion of light therethrough, although a substantially lesser porportion than passes through the filter element. In such case, the opaque portions would be only "relatively opaque" as compared to the filter element. Generally, complete opacity of the opaque portions is preferred. Further, obviously, the filter element or sheet corresponding to filter element 20 could be applied to the first disc as well as to the second disc on either side thereof and different mounting and turning means of equivalent function provided. It is intended to include all such modifications and alterations within the scope of the appended claims.

Having thus described the invention, what is claimed is:

1. An adjustable solar filter assembly for a telescope having an exterior lens comprising:
   (a) a support for detachably mounting said filter assembly in the path of light rays being gathered by the telescope, said support including a mounting fixture for engagement upon the exterior surface of the exterior lens of the telescope near the center thereof but for substantial freedom therefrom circumferentially and a support member, said mounting fixture and said support member being releasably engaged;
   (b) a first opaque shield member extending substantially concentrically about said support member and having at least one light passing opening therein and being dimensioned and configured to traverse the optical aperture of the associated telescope, said opening having a radial dimension which defines the effective optical aperture provided by the solar filter;
   (c) a light-transmitting filter element overlying said opening and having a light blocking metallic component to reduce the amount of light transmitted through said filter element;
   (d) a second opaque shield member extending substantially concentrically about said support member and having an opaque portion dimensioned and configured to overlie at least part of said opening; and
   (e) means mounting said shield members on said support member and permitting rotation of said shield members relative to each other, said second shield member thereby being movable relative to said first shield member to overlie and thereby close selected portions of said opening to reduce passage of light therethrough without reducing said radial dimension of said opening.

2. The solar filter assembly of claim 1 wherein said opaque portion is dimensioned and configured to overlie all of said opening and thereby entirely close said opening.

3. The solar filter assembly of claim 2 wherein at least said first shield member is disc shaped and has a plurality of openings formed therein which are circumferentially spaced apart and have respective outer edges which are disposed adjacent to the peripheral edge of the disc, the radial distance of the outer edges from the center of the disc defining said radial dimension of the openings.

4. The solar filter assembly of claim 3 wherein said second shield member is also disc shaped and said first and second shield members are mounted for rotation relative to each other about a common axis of rotation, and said second shield member contains a plurality of circumferentially spaced openings therein, said opaque portion of said second shield member being defined by portions thereof extending between said second mentioned openings.

5. The solar filter assembly of claim 4 wherein said second mentioned openings are dimensioned and configured substantially identically to said first mentioned openings.

6. The solar filter assembly of claim 4 wherein said first shield member contains three of said first mentioned openings equally circumferentially spaced apart.

7. The solar filter of claim 2 wherein said mounting fixture includes a magnetically susceptible washer releasably magnetically engaging said support member and adapted to be affixed to said exterior lens near its center and wherein said engagement member includes a magnetic washer.

8. The solar filter assembly of claim 1 wherein said filter element comprises a plastic sheet having a metal coating thereon.

9. The solar filter assembly of claim 1 wherein said support member and said mounting fixture are releasably magnetically engaged.

10. The solar filter assembly of claim 9 wherein said support member includes a mounting shaft and said first and second shield members have respective central passages therein and are mounted on said shaft by said shaft passing through said central passages.

11. The solar filter assembly of claim 10 wherein said support member includes an engagement member magnetically engaging said mounting fixture and retaining said mounting shaft thereon, one of said engagement member and said mounting fixture being a magnetic member and the other being a magnetically susceptible member.

12. The solar filter assembly of claim 11 wherein said engagement member is fixed to one of said shield members to prevent rotation of said one of said shield members relative to said engagement member.

13. An adjustable solar filter for a telescope comprising:
   (a) a support for detachably mounting said filter assembly upon a telescope in the path of light rays being gathered by the telescope, said support including a mounting fixture for engagement upon the exterior surface of the exterior lens of the telescope near the center thereof but for substantial freedom therefrom circumferentially and a support member, said mounting fixture and said support member being releasably engaged;
   (b) a first opaque shield member extending substantially concentrically about said support member and having a plurality of light passing openings therein and being dimensioned and configured to traverse the optical aperture of the associated telescope, said openings being defined by spaced apart radially extending side edges connecting arc shaped outer edges and inner edges spaced radially inwardly of said outer edges;
   (c) a light-transmitting filter element overlying said openings and having a light blocking metallic component to reduce the amount of light transmitted through said filter element;

(d) a second opaque shield member extending substantially concentrically about said support member and having a plurality of circumferentially spaced apart light passing openings therein of generally similar configuration as said first mentioned openings and opaque portions of said second shield member between said second mentioned openings being dimensioned and configured to overlie said first mentioned openings; and (e) means mounting said shield members on said support member and permitting rotation of said shield members relative to each other, said second shield thereby being movable relative to said first shield whereby said opaque portions overlie and thereby close selected radial portions of said first mentioned openings to reduce passage of light therethrough.

14. The solar filter assembly of claim 13 wherein said inner edges are also arc shaped and said first mentioned and second mentioned openings are each of equal size and of substantially identical configuration and are evenly circumferentially spaced apart.

15. The solar filter assembly of claim 14 wherein said first shield contains three of said first mentioned openings and said second shield member contains three of said second mentioned openings, and the radial center line of each of said openings is circumferentially spaced apart about 120° of arc from each adjacent opening.

16. The solar filter assembly of claim 15 wherein said first and second openings each subtend about 60° of arc.

17. The solar filter assembly of claim 16 wherein said filter element is a plastic sheet having an aluminum coating thereon and said first and second shield member are mounted at their respective centers upon a common mounting shaft for rotation relative to each other.

18. The solar filter assembly of claim 13 wherein said first and second opaque shield members are disc shaped and said light-transmitting filter element is affixed to one of said first and second opaque shield members.

19. The solar filter assembly of claim 10 wherein said support member and said mounting fixture are releasably magnetically engaged.

20. The solar filter assembly of claim 19 wherein said support member includes mounting shaft and said first and second shield members have respective central passages therein and are mounted on said shaft by said shaft passing through said central passages.

21. The solar filter assembly of claim 20 wherein said support member includes an engagement member magnetically engaging said mounting fixture and retaining said mounting shaft thereon, one of said engagement member and said mounting fixture being a magnetic member and the other being a magnetically susceptible member.

22. The solar filter assembly of claim 21 wherein said engagement member is fixed to one of said sheild members to prevent rotation of said one of said shield members relative to said engagement member.

* * * * *

UNITED STATES PATENT AND TRADEMARK OFFICE
CERTIFICATE OF CORRECTION

PATENT NO. : 4,165,919
DATED : August 28, 1979
INVENTOR(S) : Robert T. Little

It is certified that error appears in the above-identified patent and that said Letters Patent are hereby corrected as shown below:

Column 9, line 26, after "shield" insert -- member --

Column 10, line 16, after "includes" insert -- a --

Signed and Sealed this

First Day of April 1980

[SEAL]

Attest:

SIDNEY A. DIAMOND

Attesting Officer

Commissioner of Patents and Trademarks